(12) United States Patent
Sasama

(10) Patent No.: US 6,859,233 B1
(45) Date of Patent: Feb. 22, 2005

(54) AUTO FOCUS MECHANISM IN IMAGE INPUT APPARATUS

(75) Inventor: Kazuo Sasama, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 891 days.

(21) Appl. No.: 09/671,152

(22) Filed: Sep. 28, 2000

(51) Int. Cl.[7] .......................... H04N 5/232; H04N 1/04; G02B 1/06; G02B 3/12; G02B 27/32

(52) U.S. Cl. ..................... 348/349; 348/340; 358/474; 359/666; 359/806; 355/25

(58) Field of Search ............................. 348/208.12, 340, 348/345, 349, 351, 352, 374; 355/25, 82; 359/665, 666, 667, 668, 806, 807; 356/3.26, 474; 358/3.26, 474, 483, 514, 533

(56) References Cited

U.S. PATENT DOCUMENTS

| | | | | |
|---|---|---|---|---|
| 4,675,727 A | * | 6/1987 | Sekizawa et al. ............ | 348/340 |
| 4,783,155 A | * | 11/1988 | Imataki et al. ............... | 359/666 |
| 5,416,609 A | * | 5/1995 | Matsuda et al. ............. | 358/474 |
| 5,508,825 A | * | 4/1996 | Kataoka ...................... | 348/345 |
| 5,774,274 A | * | 6/1998 | Schachar .................... | 359/666 |
| 6,014,259 A | * | 1/2000 | Wohlstadter ................. | 359/619 |
| 6,281,862 B1 | * | 8/2001 | Tidwell et al. ................ | 345/32 |

FOREIGN PATENT DOCUMENTS

| | | |
|---|---|---|
| JP | 04056564 | 2/1992 |
| JP | 04287561 | 10/1992 |

* cited by examiner

Primary Examiner—Wendy R. Garber
Assistant Examiner—John M. Villecco
(74) Attorney, Agent, or Firm—Foley & Lardner LLP

(57) ABSTRACT

An auto focus mechanism mounts a target of reading on a manuscript board and moves an optical read unit which is long in a main scanning direction along a sub scanning direction to read an image of the target of reading. The auto focus mechanism is provided to an image input apparatus for inputting image data. The read unit includes: an optical source for irradiating the target of reading with a read light ray; a lens which accepts a reflected light ray from the target of reading and is long in the main scanning direction; a lens thickness change portion which is provided on both sides of the lens in the longitudinal direction and mechanically operates so as to change a thickness of the lens in the longitudinal direction by an electric lens; a SELFOC lens for focalizing a reflected light ray at a central portion in the sub scanning direction; and a photoelectric transfer portion for photoelectric-transferring a focalized reflected light ray to generate image data. The read portion performs focusing adjustment of the lens by using a control portion which controls the drive of the lens thickness change portion based on an electric signal photoelectric-transferred by the photoelectric transfer portion and a drive portion which generates a drive signal for driving the lens thickness change portion based on a control signal from the control portion and outputs the drive signal to the lens thickness change portion to partially change the thickness of the lens in the main scanning direction.

6 Claims, 7 Drawing Sheets

AUTO FOCUS MECHANISM IN IMAGE INPUT APPARATUS

BACKGROUND OF THE INVENTION

The present invention relates to an auto focus mechanism in an image input apparatus. And more particularly, it relates to an auto focus mechanism capable of obtaining a clear image by adjusting a focal distance of an optical system in accordance with each part thereof in a direction of installing the optical system, even if a manuscript mounted on a manuscript board of an input apparatus is not evenly in contact with an image input plane, that is, even if a focal distance of the manuscript is different at each part thereof.

Usually, a focal distance of an image read optical unit of a scanner is adjusted so as to be adapted to a target of reading (manuscript) fittingly mounted on an image input plane of a manuscript board. If the target of reading is a sheet of manuscript, the focal distance can be adjusted with respect to the manuscript since the entire manuscript is adhered to the image input plane of the manuscript board. However, if the manuscript is, e.g., an opened book or the like, a part of the target of reading corresponding to a bind-in portion of the opened book is distanced from the image input plane, so that the focal distance can not be adjusted to that portion.

Further, as means for adjusting the focal distance, if a conventional auto focus mechanism using a movement adjustment mechanism for moving a position of, e.g., a CCD sensor or a movement adjustment mechanism or the like for moving a position of a SELFOC lens (GRIN—gradient index—lens) is applied, a manuscript such as the above opened book can be theoretically read by automatic focus adjustment. Such a conventional auto focus mechanism is provided to a read mechanism comprising a long optical system which is parallel with one side of the manuscript board under the manuscript board made of, e.g., a rectangular glass and a moving mechanism for reciprocating this optical system in one direction along the other side of the manuscript board.

The conventional auto focus mechanism automatically adjusts the focal position of the optical system by the above structure. Therefore, if the target of reading whose focal distance differs at each part of a manuscript such as the opened book has the same focal distance along the direction of the installation of the optical system (one side of the manuscript board), i.e., if the bind-in portion of the book is mounted along one side of the manuscript board, the part of the manuscript lifted up from the image input plane can be adjusted by the same automatic focus adjustment operation, and the part of the manuscript lifted up from the glass plate as well as the part of the manuscript adhered to the glass plane of the mounting board can be also read as a substantially good image.

However, even the image input apparatus having such an auto focus mechanism can not accurately adjust the focal position of the manuscript which is, for example, obliquely lifted up from the optical system for reading, and an excellent input image can not be obtained.

SUMMARY OF THE INVENTION

In order to eliminate the above-described problems, it is an object of the present invention to provide an auto focus mechanism in an image input apparatus capable of obtaining an appropriately focused input image at both a portion of a manuscript adhered to an image input plane of a manuscript board of an image input apparatus and a portion of the manuscript lifted up from the image input plane.

It is another object of the present invention to provide an auto focus mechanism in an image input apparatus capable of obtaining a uniform image from a target of reading whose foal position differs in accordance with each portion in a direction for installing an optical system in an image input apparatus.

To achieve this aim, an auto focus mechanism according to a basic structure of the present invention which mounts a target of reading on a manuscript board and moves optical reading means which is long in a main scanning direction along a sub-scanning direction to read an image of the target of reading and which is provided to an image input apparatus for inputting image data, comprises: an optical reading portion including an optical source which irradiates the target of reading with a reading light ray, a lens which receives a reflected light ray from the target of reading and is long in the main scanning direction, a lens thickness change portion which is attached to both sides of the lens in the longitudinal direction and mechanically operates so as to change a thickness of the lens in the longitudinal direction, a SELFOC lens for transmitting therethrough a reflected light ray passed through the lens in the form of a parallel light beam to be focalized at a central portion, and a photoelectric transfer portion for photoelectric-transferring a reflected light ray focused by the SELFOC lens to generate image data; a control portion for generating a control signal for controlling the drive of the lens thickness change portion based on an electric signal photoelectric-transferred by the photoelectric transfer portion; and a drive portion which generates a drive signal for driving the lens thickness change portion based on the control signal from the control portion and outputs the drive signal to the lens thickness change portion to partially change a thickness of the lens in the main scanning direction.

A piezoelectric device for converting an electrical action may constitute the lens thickness change portion by the drive signal supplied from the drive portion into a mechanical action such as pushing the lens from the side surface.

In addition, the lens thickness change portion may be constituted by a piezoelectric device for converting an electrical action by the drive signal supplied from the drive portion into a mechanical action such as pushing the lens from the side surface and the piezoelectric device may be divided into a plurality of blocks with respect to one lens in the main scanning direction thereof.

Further, a piezoelectric device for converting an electrical action may constitute the lens thickness change portion by the drive signal supplied from the drive portion into a mechanical action such as pushing the lens from the side surface. Furthermore, the piezoelectric device may be divided into a plurality of blocks with respect to one lens in the main scanning direction thereof, and a plurality of the blocks may be constituted such that focal distances is individually variable.

The control portion may be constituted by an auto focus unit which detects a part of the electric signal outputted from the photoelectric transfer portion corresponding to an edge of a detected image and which outputs a focus signal as a control signal for focusing.

The drive portion may be constituted by a piezoelectric device drive circuit which receives the focus signal as the control signal outputted from the auto focus unit as the control portion and mechanically operates the piezoelectric device as the lens thickness change portion by the focus signal.

The piezoelectric transfer portion may be constituted by a CCD sensor in which a plurality of pixels of a charge coupled device are arranged and which converts a light ray received by each pixel into an electric signal to be outputted.

The long lens may be constituted by a material which is soft so as to be capable of changing the thickness of the lens thickness change portion by moving the lens thickness change portion provided on the both sides of the lens by a weak electric signal.

DESCRIPTION OF THE EMBODIMENT

Figure 1:
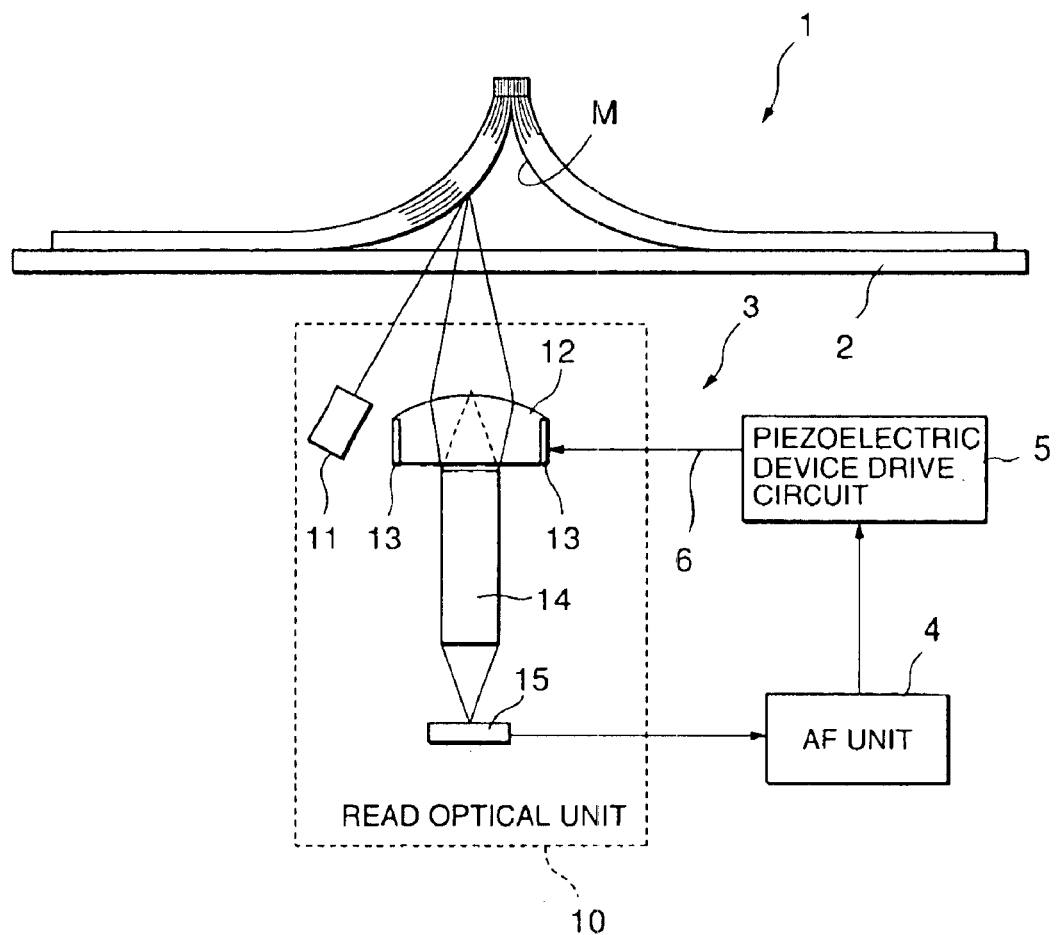
FIG. 1 is a block diagram showing an auto focus mechanism according to an embodiment of the present invention from a side surface of a scanner.

A preferred embodiment of an auto focus mechanism in an image input apparatus according to the present invention will now be described hereunder in detail with reference to the accompanying drawings. FIG. 1 is a schematic cross-sectional view showing an auto focus mechanism according to an embodiment of the present invention seen from the side surface of a scanner.

In FIG. 1, an image input apparatus 1 includes a manuscript board 2 which mounts thereon a target of reading M such as a manuscript and is formed of a transparent material such as glass, and an auto focus mechanism 3 which has an optical system and a photo acceptance unit and the like and can adjust a focal distance of the optical system. The auto focus mechanism 3 includes: a read optical unit 10; an auto focus (AF) unit 4; a piezoelectric device drive circuit 5; and a signal line 6. The read optical unit 10 is constituted by an optical source 11 for irradiating the manuscript M as the target of reading with a light ray through the manuscript board 2, a lens 12 upon which a reflected light ray from the manuscript M is incident through the manuscript board 2, a piezoelectric device 13 which is provided on the outer periphery side of the lens 12 and adjusts the thickness of the lens 12 to be variable, a SELFOC lens 14 for passing therethrough a reading light ray incident upon the lens 12 as it is, and a charged coupled device (which will be abbreviated as CCD—Charge Coupled Device—hereinafter) sensor 15 as a photoelectric transfer device which photoelectric-transfers the reading light ray passed through the SELFOC lens 14.

In such a structure as shown in FIG. 1, a light ray emitted from the optical source 11 is projected to the manuscript M as the target of reading to be reflected thereon. The lens 12 to be gathered to the SELFOC lens 14 condenses the light ray. The SELFOC lens 14 emits the light ray to the CCD sensor 15, and the CCD sensor 15 reads an image from the manuscript M by using the brightness of the emitted light ray. Although illustration is omitted, an image signal read to be photoelectric-transferred by the CCD sensor 15 is reproduced as an image by an image forming apparatus such as a facsimile or a printer. This regular image forming process is not a characteristic of the present invention, but the present invention is characterized in the focusing structure and the operation of the auto focus mechanism 3. Thus, the operation of the auto focus mechanism 3 will now be described.

The CCD sensor 15 of the read optical unit 10 accepts the light ray reflected by the manuscript M as the target of reading to read an image put on the manuscript M through the SELFOC lens 13 and photoelectric-transfers the image based on the brightness of an image to generate an electric signal. The electric signal generated by the CCD sensor 15 is, as described above, supplied to the non-illustrated image forming apparatus as well as the AF unit 4. The AF unit 4 extracts an electric signal at an edge portion of the image and generates an electric signal for focusing in accordance with the intensity of the extracted signal so that the generated signal is outputted to the piezoelectric device drive circuit 5.

The piezoelectric device drive circuit 5 outputs a control signal to the piezoelectric device 13 for adjusting the thickness of the lens 12 provided to the read optical unit 10 through the signal line 6 in order to control the piezoelectric device 13. The piezoelectric device 13 accepts a control signal from the piezoelectric device drive circuit 5 to be converted into a mechanical change so that the lens 12 is deformed. As the lens 12, there is used a soft material such as soft synthetic resin, for example, a material such as a HEMA—HydroxiEthyl MethAcrylate—which is a material for a soft contact lens or silicon rubber. Even the weak mechanical change of the piezoelectric device can deform a shape of such a material to adjust the thickness. The piezoelectric device 13 is a device formed by a material having the piezoelectric effect for converting an electrical change into a mechanical change.

Figure 2:
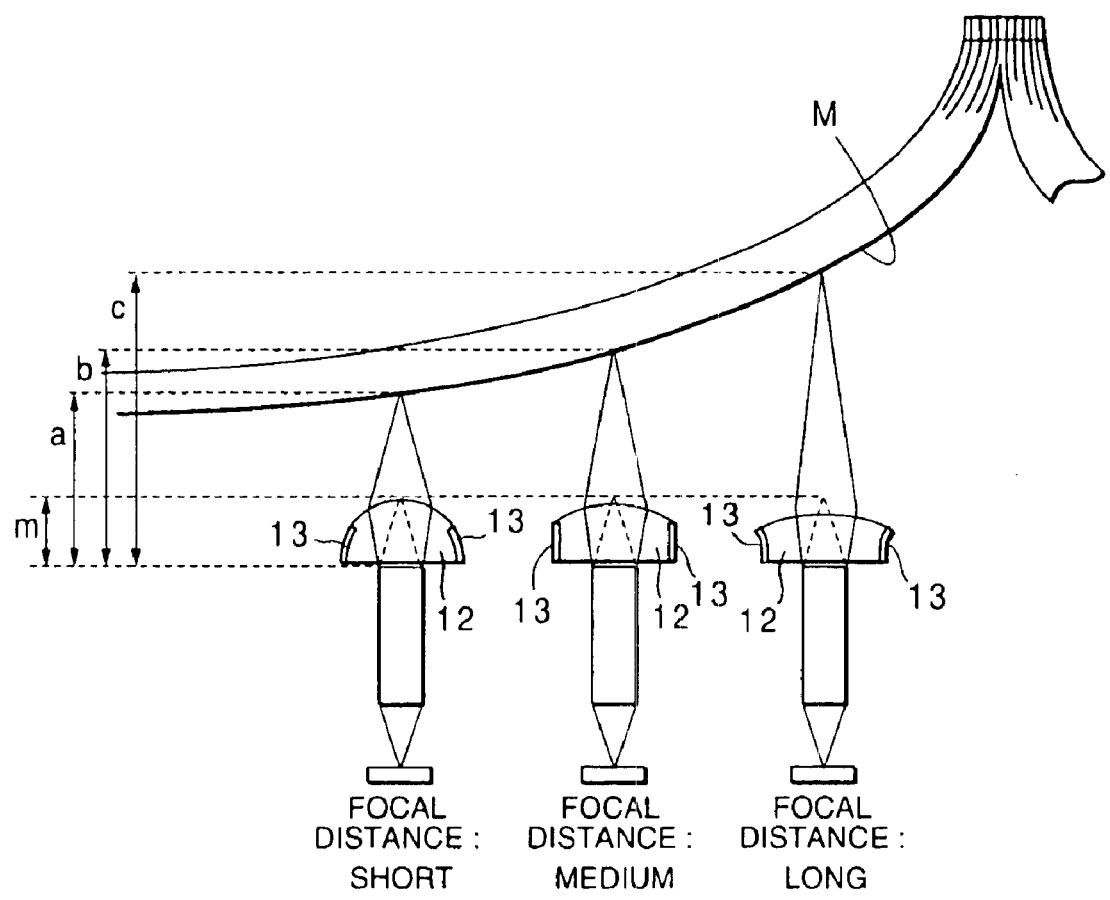
FIG. 2 is an explanatory drawing showing deformation of a lens and a change in a focal distance.

FIG. 2 is an explanatory drawing showing deformation of the lens 12 and changes in the focal distance. Even if a position of the manuscript M as a target of reading varies to change a focal distance, the piezoelectric device 13 deforms the lens 12 to adjust the focal distance of the lens 12. Although the focal distance from the SELFOC lens with no lens 12 typically takes a distance m shown in FIG. 2, various distances such as a distance a, a distance b, and a distance c can be taken in accordance of a degree of deformation of the lens 12 when the lens 12 having the piezoelectric device 13 is added.

In other words, if the manuscript M as the target of reading is close to the glass plane of the manuscript board, the piezoelectric device 13 adjusts the thickness of the lens 12 in such a manner that the focal distance of the lens 12 becomes the distance a. If the manuscript M as the target of reading is moderately lifted from the glass plane of the manuscript board, the piezoelectric device 13 adjust the thickness of the lens 12 in such a manner that the focal distance of the lens 12 becomes the distance b. If the manuscript M as the target of reading is far from the glass plane of the manuscript board, the piezoelectric device 13 adjusts the thickness of the lens 12 in such a manner that focal distance of the lens 12 becomes the distance c.

Figure 3:
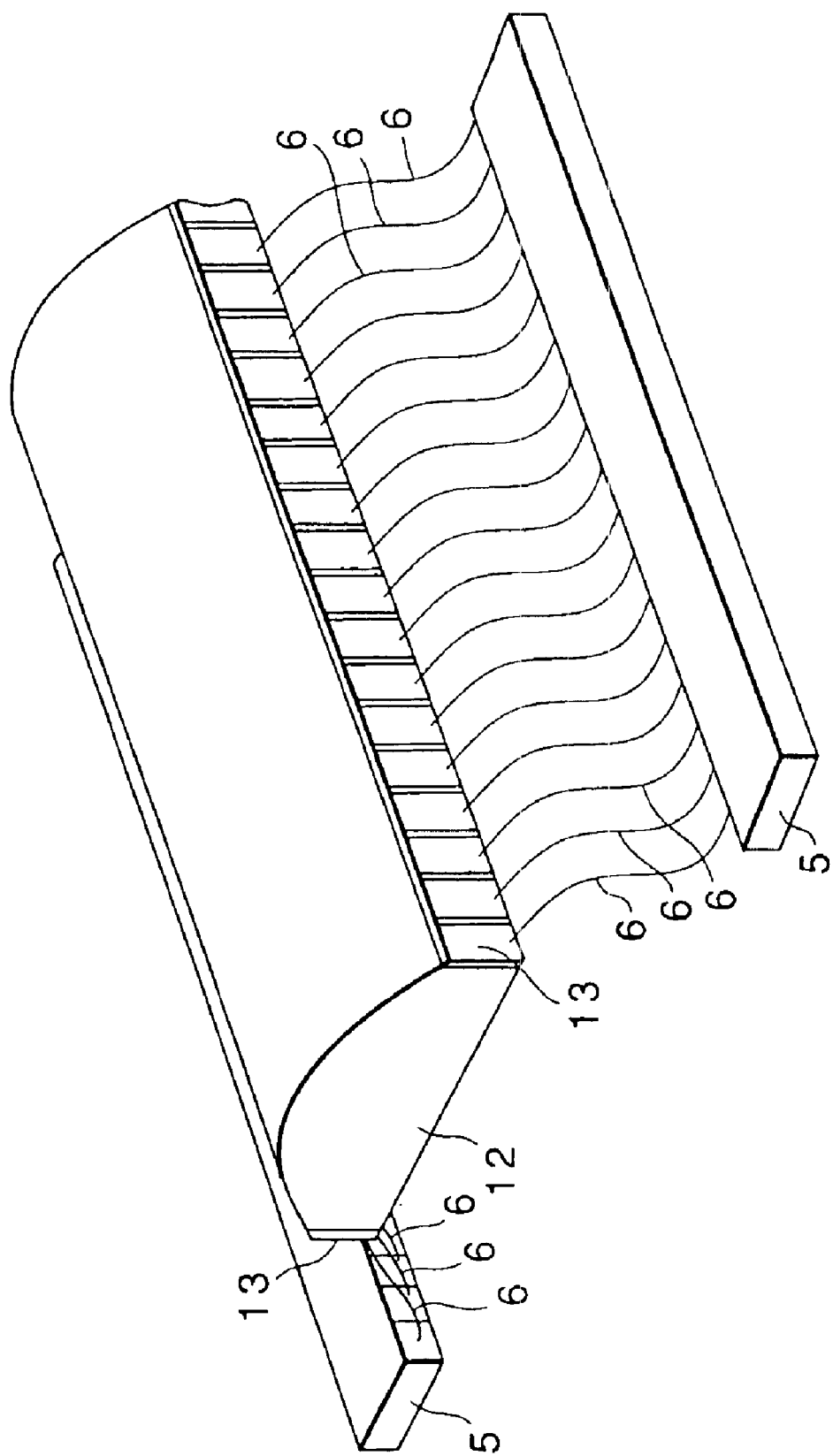
FIG. 3 is a perspective view showing a connection state of the lens, a piezoelectric device and a piezoelectric device drive circuit.

FIG. 3 is a perspective view showing the assembling state of the lens 12 and the piezoelectric device 13 and the electrical connection state between the piezoelectric devices 13 and the piezoelectric device drive circuit 5 through the signal lines 6. A plurality of piezoelectric devices 13 are arranged on both sides of the long lens 12 corresponding to one side of the glass plane of the rectangular manuscript board. Since the signal lines 6 electrically connect the respective piezoelectric devices 13 and the drive circuit 5, the piezoelectric device drive circuit 5 can individually control the piezoelectric devices 13. Although a plurality of the piezoelectric devices 13 are provided, only one long lens 12 is provided. Therefore, when a mechanical change of each piezoelectric device 13 continuously deforms the lens 12, it is possible to give a change in a shape of the lens 12 so as to set thickness which differ in accordance with each portion of the long lens 12 in the longitudinal direction.

Figure 4:
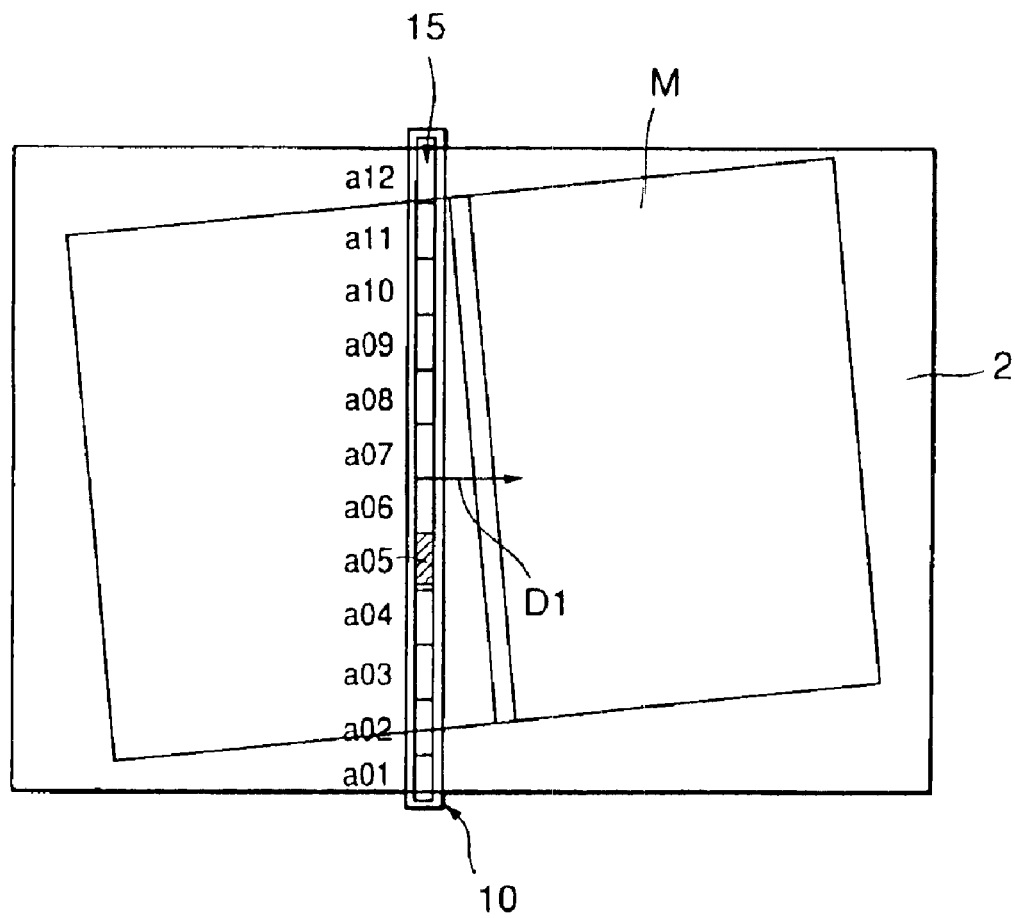
FIG. 4 is a plane view showing the state in which a CCD sensor provided in an optical unit into a plurality of blocks together with a target of reading.

FIG. 4 is a block diagram showing that the CCD sensor 15 in the read optical unit 10 is divided into a plurality of parts in a direction orthogonal to a traveling direction D1 of the read optical unit 10 so that focusing is enabled in accordance with each divided part. In order to perform focusing by using the CCD sensor 15, a change point in fetched image data must be detected. The CCD sensor 15 detects an edge portion of the image read from the manuscript M and converts the detected portion into a signal for focusing to be used. If an image region to be detected is small, a change point in the image data is hardly detected. In the auto focus mechanism 3, therefore, a plurality of pixels are determined as one block, and a change point in the image data is extracted from a change in the brightness of the pixels in the block to be utilized as a signal for focusing.

Referring to FIG. 4, the CCD sensor 15 is divided into multiple blocks a01 to a12 to extract a signal for focusing in each block. In FIG. 4, the long CCD sensor 15 is provided along the short side of the manuscript board 2, and this CCD sensor 15 is divided into a plurality of parts in the direction of the short side. The manuscript M as the target of reading is constituted by such a book as shown in FIGS. 1 and 2 and mounted on the manuscript board 2 with the positional relationship such that the bind-in portion of the book inclines with respect to the CCD sensor 15. Therefore, as to the part in the image reading surface of the manuscript M which is lifted up from the glass plane of the manuscript board 2 and corresponds to the bind-in portion, the positions with the long focal distance sequentially moves, for example, from the block a11 side to the block a02 of the CCD sensor 15 in the order of a10, a09, ... , a05, a03. In cooperation with this movement, a position with a medium focal distance or a position with a short focal distance also move in each block.

Figure 5:
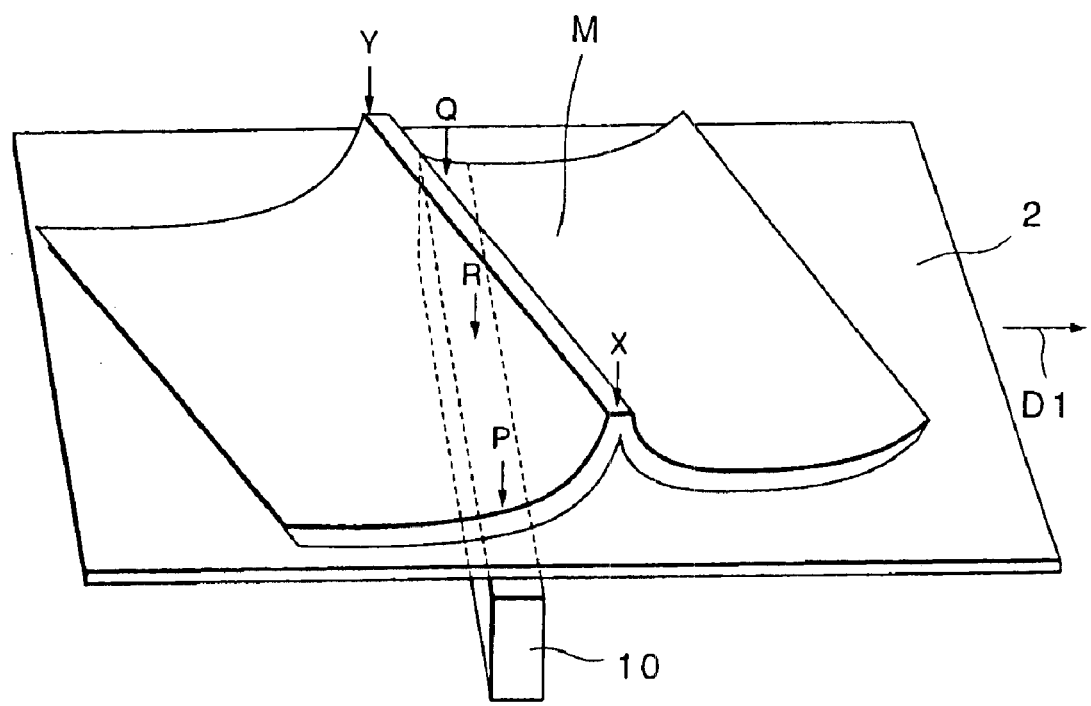
FIG. 5 is a perspective view showing the positional relationship between the target of reading mounted on a manuscript board and the optical unit.

FIG. 5 is a perspective view looking down upon the plane view of FIG. 4 from information on the manuscript board 2. FIG. 5 shows the state of the manuscript M lifted up from the manuscript board 2 in a way easy to understand. In FIG. 5, the relationship between the read optical unit 10 and the manuscript M is such that the direction of the manuscript M at the central portion (X to Y) away from the manuscript board 2 by a long distance inclines with respect to the direction of the read optical unit 10 at the portion (P to Q), which is different from both the parallel relationship and the orthogonal relationship. That is, the central portion of the manuscript M also inclines with respect to the moving direction DI of the read optical unit 10 and the to central portion (X to Y) is not orthogonal to the moving direction D1.

The fact that the central portion of the manuscript M is not orthogonal to the moving direction D1 means that the focal distance of the read optical unit 10 in the vicinity of R and the respective focal distances in the vicinity of P and Q are all different. That is, the focal distance of the read optical unit 10 at the point Q is long as shown on the right-hand side in FIG. 2; the focal distance of the same at the point R is medium as shown in the central part in FIG. 2; and the focal distance of the same at the point P is short as shown on the left-hand side in FIG. 2.

In this manner, since the image reading distances at the respective points of the manuscript M differ from each other, the focal positions of the respective points Q, R and P of the read optical unit 10 have the following problem. That is, adapting to the focal distance at the point Q causes the focal distances at the points R and P to be inappropriate; adapting to the focal distance at the point R causes the focal distances at the points Q and R to be inappropriate; and adapting to the focal distance at the point P causes the focal distances at the point Q and R to be inappropriate. Therefore, in order to individually focus in the vicinity of the respective points P, Q and R, separate focus mechanisms are required at each of the points P, Q and R.

In the auto focus mechanism according to the present invention, as shown in FIG. 4, the part between the point P and the point Q of the read optical unit 10 is divided into a plurality of blocks to extract a signal for focusing in each block, and the lens 12 is deformed in accordance with each portion to perform focusing at each portion. Thus, even in the state shown in FIGS. 4 and 5, focusing is enabled in the entire part (the points P to Q) of the read optical unit 10.

Figure 6:
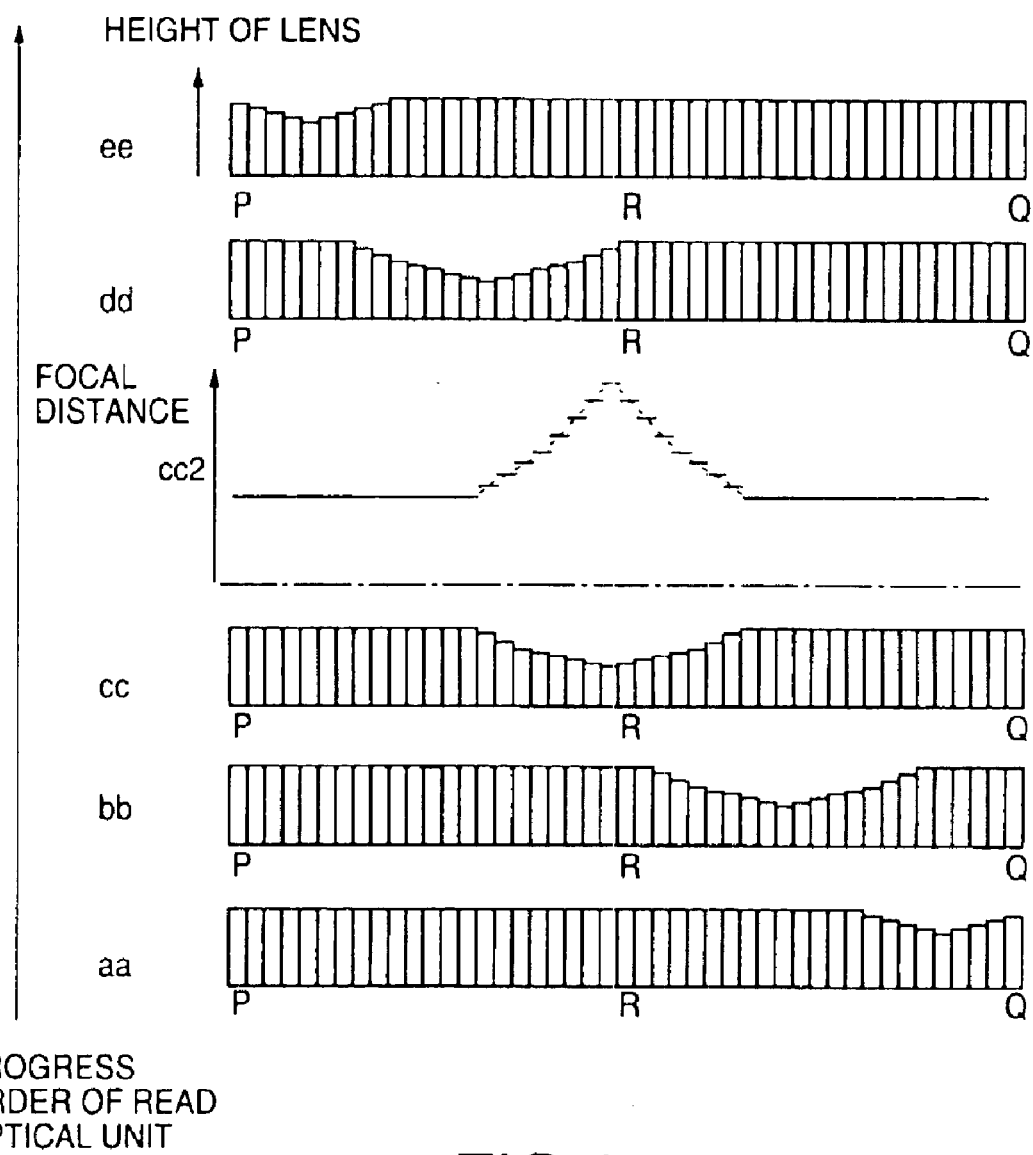
FIG. 6 is a characteristic view showing a change in the height of the lens due to movement and deformation of the optical unit when inputting an image from the target of reading in the state of FIG. 5.

FIG. 6 is a characteristic view showing the relationship between the progress of the read optical unit 10 and a change in the height of the lens caused due to deformation of the piezoelectric device 13 when reading the manuscript M as the target of reading in the state of FIG. 5. The vertical direction of aa, bb, cc, dd and ee indicates the peak height of the lens 12 obtained by the deformation force of the piezoelectric device 13 in accordance with each portion. The horizontal direction of the same indicates the positions P, R and Q of the read optical unit 10 in FIG. 5.

The height of the lens is changed in the order of aa, bb, cc, dd and ee with the progress of the read optical unit 10 in order that the focal distances at the respective portions are adjusted. The progress of the read optical unit 10 first causes the height of the manuscript M to increase with respect to the manuscript board 2 in the vicinity of the position P of the read optical unit 10. As the read optical unit 10 further makes progress, the height in the vicinity of the position Q increases. In accordance with a change in the height, the lens 12 is deformed by the piezoelectric device 13 for focusing, and the thickness of the lens 12 at a portion corresponding to the position where the height of the manuscript M increases is gradually reduced as shown in the right part in FIG. 2.

A symbol cc2 in FIG. 6 indicates the focal distance of the lens which is in the lens state of cc. The lens 12 is designed such that the focal length becomes long when the lens 12 is deformed by the piezoelectric device 13 to decrease its height. As indicated by cc2 in FIG. 6, therefore, the focal distance therefore becomes long in inverse proportion to the height of the lens 12. In cc2 of FIG. 6, the focal distance is shown in the step form. However, since there is only one lens 12, the height of the lens 12 is smoothly changed by the force of the piezoelectric devices 13 adjacent to each other. Such a focal distance as shown by the dotted line is taken.

Figure 7:
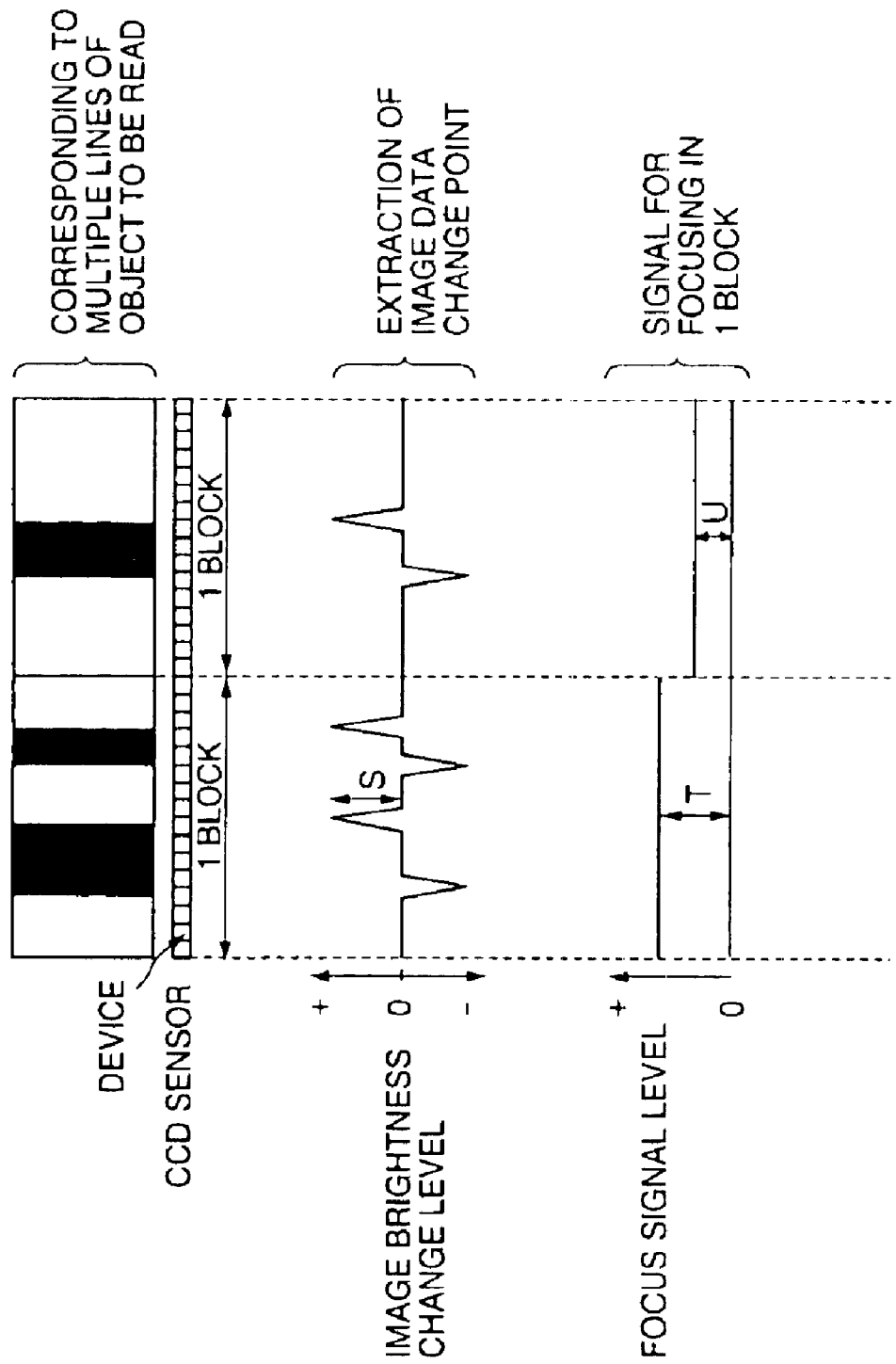
FIG. 7 is a characteristic view showing an image in one block of the CCD sensor and an image brightness change point extraction level and a focus signal level in the auto focus mechanism.

FIG. 7 is a characteristic view showing an image in one block of the CCD sensor 15, and an image brightness change point extraction level and a focus signal level in the AF unit 4. One block of the CCD sensor 15 shown in FIG. 4 is constituted by a plurality of CCDs. In the example shown in FIG. 7, the CCD sensor 15 for 16 pixels is assigned in one block. A change point of the brightness is extracted from a black and white image on the manuscript M as the target of reading to produce a focus signal level. Since the change point of the brightness appears in a change point of black and white of the manuscript M, the change point is extracted from an output signal of the CCD sensor 15.

Since a peak level of the brightness change point becomes higher when focalized, a sum of the change points in the block becomes large. The change point is extracted in units of blocks in order to enlarge a difference between the state in focus and the state out of focus by increasing a sum of the change points and to increase a ratio of successful detection of the change points on the manuscript M as the target of reading. A sum of the levels of the change points in the brightness signal is proportionally converted into the focus signal level to generate an output of the fixed level in one block. The focus signal levels T and U have different values in accordance with blocks. That is because images of the manuscript M as the target of reading in a block are different from each other when the focal depths are different.

In the AF unit 4, a control signal for controlling the piezoelectric device drive circuit is generated to be outputted by the focus signal level. This control signal controls the piezoelectric device drive circuit 5 to drive the piezoelectric device 13 so that the focal length of the lens 12 is changed. This change in the focal distance is again read by the CCD sensor 15 to change the focus signal level. The AF unit 4 executes control to cause the focus signal to be the maximum so that there is adjusted the focal distance to the manuscript M as the target of reading in units of one block.

As described above, the auto focus mechanism in the image input apparatus according to the present invention also focalizes image data of the manuscript as the target of reading which is not adhered to the manuscript board of the image input apparatus, and even the manuscript mounted apart from the manuscript board can be read as clear image data.

Further, even if the focal distances in the line width direction on the manuscript on one line of the read optical unit are different in the main scanning direction, an image can be fetched while adjusting the different focal distances in the main scanning direction by dividing the read optical unit into a plurality of parts in the main scanning direction. Thus, the definition when reading image data can be uniformed in the main scanning direction, and clear image data can be obtained across the manuscript.

What is claimed is:

1. An auto focus mechanism which mounts a target of reading on a manuscript board and moves an optical reading means elongated in a main scanning direction along a sub scanning direction to read an image of said target of reading and which is provided to an image input apparatus for inputting image data, said mechanism comprising:

an optical read portion including: an optical source for irradiating said target of reading with a reading light ray: a lens which accepts a reflected light ray from said target of reading and is long in a main scanning direction; a lens thickness change portion which is attached on both sides of said lens in a longitudinal direction thereof and mechanically operates so as to change the thickness of said lens in the longitudinal direction by an electric signal, a SELFOC lens for passing therethrough a reflected light ray passed through said lens in the form of a parallel light beam to be focalized at a central portion, and a photoelectric transfer portion which photoelectric-transfers a reflected light ray focalized by said SELFOC lens to generate image data;

a control portion for generating a control signal for controlling the drive of said lens thickness change portion based on an electric signal photoelectric transferred by said photoelectric transfer portion; and a drive portion which generates a drive signal for driving said lens thickness change portion based on said control signal from said control portion and which outputs said drive signal to said lens thickness change portion to partially change the thickness of said lens in said main scanning direction, wherein said lens thickness change portion is constituted by a piezoelectric device which converts an electrical action by a drive signal supplied from said drive portion into a mechanical action of pushing said lens from a side surface, and said piezoelectric device is divided into a plurality of blocks with respect to one lens in a main scanning direction thereof, a plurality of said blocks being capable of individually varying focal distances in accordance with each block.

2. The auto focus mechanism according to claim 1, wherein said control portion is constituted by an auto focus unit which detects a part of said electric signal outputted from said photoelectric transfer portion corresponding to an edge of a detected image and which outputs a focus signal as a control signal for focusing.

3. The auto focus mechanism according to claim 2, wherein said drive portion is constituted by a piezoelectric device drive circuit which accepts said focus signal as said control signal outputted from said auto focus unit as said control portion and mechanically operates said piezoelectric device as said lens thickness change portion by using said focus signal.

4. The auto focus mechanism according to claim 3, wherein said drive portion is constituted by a piezoelectric device drive circuit which accepts said focus signal as said control signal outputted from said auto focus unit as said control portion and mechanically operates said piezoelectric device as said lens thickness change portion by using said focus signal.

5. The auto focus mechanism according to claim 3, wherein said photoelectric transfer portion is constituted by a CCD sensor which has a plurality of pixels of a charge coupled device arranged and converts a light ray received by each pixel into an electric signal to be outputted.

6. The auto focus mechanism according to claim 1, wherein said long lens is constituted by a soft material capable of changing its thickness by movement of said lens thickness change portion provided on both sides of said long lens by an electric signal.

* * * * *